United States Patent [19]

Barnhart

[11] 4,047,935

[45] Sept. 13, 1977

[54] PROCESS FOR DIRECT-REDUCTION OF IRON-ORE EMPLOYING NUCLEAR REACTOR-POWDERED CATALYTIC REFORMER

[75] Inventor: Thomas F. Barnhart, O'Hara Township, Allegheny County, Pa.

[73] Assignee: United States Steel Corporation, Pittsburgh, Pa.

[21] Appl. No.: 531,829

[22] Filed: Dec. 11, 1974

[51] Int. Cl.$^2$ .................... C21B 13/00; C07C 1/02
[52] U.S. Cl. .................................. 75/34; 75/21; 75/35; 75/36; 75/91; 252/372; 252/373
[58] Field of Search .................. 252/373, 372; 75/21, 75/29, 343, 25, 36, 37, 41, 42, 90 R, 91, 11, 26; 423/648, 650, 655; 60/17, 18; 208/133

[56] References Cited

U.S. PATENT DOCUMENTS

| 3,136,623 | 6/1964 | Mader et al. | 75/34 |
| 3,148,050 | 9/1964 | Bogdandy | 75/34 |
| 3,160,499 | 12/1964 | Pfeiffer et al. | 75/35 |
| 3,469,969 | 9/1969 | Schenck et al. | 75/26 |
| 3,591,364 | 7/1971 | Reynolds et al. | 75/42 |
| 3,764,299 | 10/1973 | Wenzel | 75/42 |
| 3,816,102 | 6/1974 | Celada et al. | 75/35 |
| 3,862,834 | 1/1975 | von Naclawiczek et al. | 75/11 |
| 3,864,465 | 2/1975 | Hoffert | 423/648 |

FOREIGN PATENT DOCUMENTS 72-8856  12/1972  South Africa .......................... 75/21

OTHER PUBLICATIONS

Rippons, (ed.) *Nuclear Engineering International*, vol. 18, Jan., 1973 pp. 330, 331, 334–337, & 342–344.

*Primary Examiner*—Walter R. Satterfield
*Attorney, Agent, or Firm*—William L. Krayer

[57] ABSTRACT

A method of reforming a fluid to make it suitable for use as a reducing gas in a direct reduction process is provided. The method is also taught in conjunction with a specific process for which it is particularly suited. The method uses a high-temperature gas-cooled nuclear reactor as a heat source for a catalytic reformer which is coupled with a cryogenic gas separation step to remove a substantial amount of the unreacted hydrocarbon.

14 Claims, 3 Drawing Figures

PROCESS FOR DIRECT-REDUCTION OF IRON-ORE EMPLOYING NUCLEAR REACTOR-POWDERED CATALYTIC REFORMER

BACKGROUND OF THE INVENTION

This invention relates to production of a reducing gas useful in a direct reduction process and, more particularly, this invention relates to the use of a high-temperature gas-cooled (HTGR) nuclear reactor coupled with a reformer and a cryogenic gas separation unit for the production of a reducing gas for use in the direct reduction process.

In view of the world's serious energy problems and, particularly, the world shortage of metallurgical grade coking coal that is required to support the traditional blast furnace processes of reducing iron ore, it would be advantageous to have some method of meeting the world's steel requirements, other than conventional methods, that would conserve the shortage of raw materials and, particularly, fossil fuels.

One such method involves the use of nuclear energy. Probably the most likely possibilities for the application of nuclear energy to steelmaking are two well known processes—direct reduction in a shaft furnace and refining in an electric furnace. Although direct reduction is a fairly new process, it is becoming well developed and is in commercial use in various parts of the world where low-cost natural gas is available. In the direct reduction process, lump iron ore or iron ore pellets are reduced in the solid condition to a product sometimes known as sponge iron, containing less oxygen than ore. The reaction requires high temperatures and is also highly endothermic, requiring substantial amounts of heat. Nuclear energy could be used to provide at least a portion of the heat required for direct reduction of iron ore. Processes for direct reduction differ in certain details; however, almost all these processes use as a redundant a gas mixture of carbon monoxide and hydrogen at temperatures from about 1400° to about 1800° F.

In conventional direct reduction plants using fossil-fired reformers, it is customary to burn the off-gas from the direct reduction shaft furnace as fuel for the reformer. In a nuclear heated reformer, there is no need for fossil-firing so that a shaft furnace off-gas may be purified and recirculated to realize a desirable fuel efficiency. Therefore, natural gas requirements can be reduced from about 13,000 scf per ton of reduced product for conventional reforming to from about 5,500 to about 8,000 scf per ton of reduced product for nuclear reforming. Even in the most inefficient case I studied, in using my invention, a natural gas savings of about 35 percent was realized; and in the most efficient case, the savings approached 60 percent. This principle of recirculation imposes stricter requirements on the level of contaminating inert gases and unreacted hydrocarbons because they are built up to unacceptable levels in the recirculating loop. For this reason, it is necessary to provide a method of removing excess water and unreacted hydrocarbons from the reformer exit gases before these gases can be considered acceptable for a direct reduction process.

The production of steel by electric arc furnaces is a long established commercial process. Electric furnace capacity in the United States alone is about 30 million tons a year. Almost all of that tonnage is made with scrap as the only ferrous charge. Sponge iron could be used for a large portion of the charge if the cost were competitive with scrap.

I am aware of current development work being conducted in Europe to provide a method of producing an acceptable reducing gas with the use of nuclear power. However, the work is centered around the development of a new generation of HTGR nuclear reactors capable of attaining core coolant temperatures several hundred degrees higher than are obtained in present day HTGR nuclear reactors. Core coolant temperatures of about 1750° F are required in order to obtain high enough reforming temperatures to minimize methane breakthrough to an acceptable level.

The Japanese are also developing another new concept of an HTGR nuclear reactor capable of obtaining core coolant temperatures of about 1830° F. Both of the HTGR nuclear reactor concepts, however, require considerable development work and testing before they can be considered acceptable for commercial operation. Such a develoment will require a substantial expenditure of time and money, extending the time when nuclear steel could be commercial.

I am also aware of the use of a cryogenic separation unit for use in ammonia plants as taught in an article published in HYDROCARBON PROCESSING, entitled "Syngas Purifier Cuts Ammonia Costs," by Bernard J. Grotz, C. F. Braun and Co., Alhambra, Calif.

I have invented a method which will greatly expedite the time necessary to commercialize nuclear steelmaking by employing a prismatic design HTGR nuclear reactor, such as manufactured by General Atomic Company of San Diego, Calif., and presently installed in a power reactor at Ft. St. Vrain, Col., which operates with a coolant pressure of about 700 psig, which has been found to be optimal for efficient reactor operation. For mechanical reasons, it is desirable to design any reformer or heat exchanger using reactor coolant as a heating medium at a pressure of about 500 psig to minimize the pressure differential across the tubes and tube sheets. At this temperature and pressure an unacceptable amount of methane breakthrough will be experienced in the reforming exit gases. Therefore, I provide an HTGR nuclear reactor as a heat source for a catalytic reformer which is coupled with a cryogenic gas separation unit to remove a substantial amount of the unreacted hydrocarbon, thereby rendering the reformer gas acceptable for a direct reduction process.

I am also aware of the following prior art:

| Patent No. | Date | Inventor | U. S. Classification |
|---|---|---|---|
| 2,998,303 | 8/61 | Huebler | 23–212 |
| 3,026,683 | 3/62 | Palazzo, et. al. | 62–17 |
| 3,136,623 | 6/64 | Mader, et. al. | 75–34 |
| 3,148,050 | 9/64 | Bogdandy | 75–34 |
| 3,282,677 | 11/66 | Futakuchi, et. al. | 75–34 |
| 3,315,475 | 4/67 | Harmens | 62–12 |
| 3,382,045 | 5/68 | Habermehl, et. al. | 23–213 |
| 3,453,835 | 7/69 | Hochgesand | 62–17 |
| 3,532,467 | 10/70 | Smith, et. al. | 23–212 |
| 3,591,364 | 7/71 | Reynolds, et. al. | 75–42 |
| 3,594,305 | 7/71 | Kirk, Jr. | 208–10 |
| 3,618,331 | 11/71 | Smith, et. al. | 62–11 |
| 3,628,340 | 12/71 | Meisler | 62–18 |

OBJECTS OF THE INVENTION

It is therefore the primary object of my invention to provide a method of making a reducing gas useful in a direct reduction process by combining a reformer, a cryogenic gas separation unit, and an HTGR nuclear reactor.

Another object of my invention is the provision of a method of refining either natural gas or a synthetic gas derived from coal or heavy hydrocarbons.

Still another object of my invention is to provide an intermediate loop and the necessary coolant associated therewith interposed between the catalytic reformer and nuclear reactor to provide a barrier between the nuclear reactor and the reformer.

Still yet another object of my invention is to provide a method of removing unreacted hydrocarbon to a level of no more than about 5 percent by volume (dry basis) in the gas used in the direct reduction process.

A further object of my invention is to provide a method of producing a reducing gas for use in a direct reduction process which can save up to 60 percent of the natural gas required for production of the reforming gas over processes used prior to my invention.

A yet further object of my invention is the provision of a method to provide a direct reduction reforming gas having between 85 to 97 percent hydrogen and carbon monoxide.

These and various other objects and advantages of my invention will become apparent from the following detailed description when taken in conjunction with the attached drawings.

DESCRIPTION OF THE PREFERRED AND ALTERNATIVE EMBODIMENTS

Figure 1:
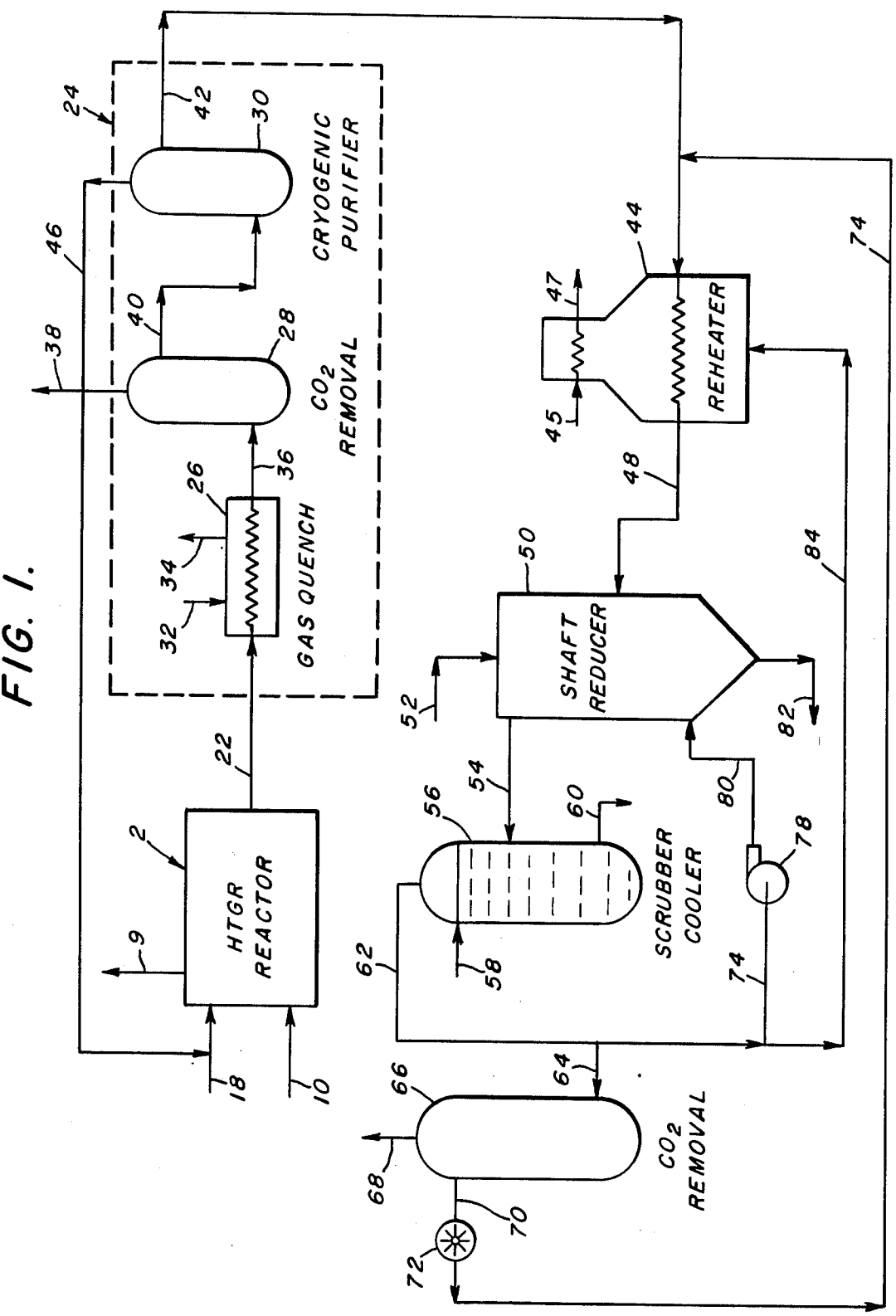
FIG. 1 is a diagrammatic view showing the proposed flowsheet of my invention.
Figure 2:
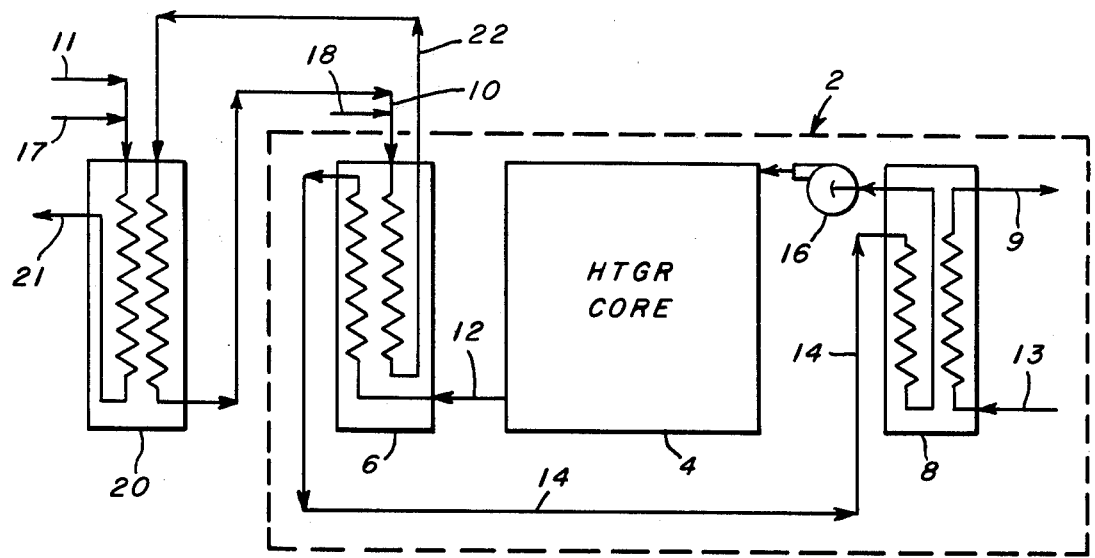
FIG. 2 is a more detailed diagrammatic showing of the HTGR nuclear reactor core and associated coolant loops shown in FIG. 1.

Now referring more particularly to FIGS. 1 and 2, an HTGR nuclear reactor generally designated as 2 has a core 4, which operates at a core coolant temperature between about 1430° and about 1650° F, a catalytic reformer 6 and a steam generator 8 located within a container vessel (not shown). A fluid selected from the group consisting of gaseous and light hydrocarbon fluids is supplied to the catalytic reformer 6 through a line 10 connected to a fluid supply source (not shown). When used in this specification, the term, "light hydrocarbon fluid," means a hydrocarbon fluid having a boiling point of about 350° F or below. The fluid is preferably natural gas, but it may optionally be a synthetic methane gas derived from a group consisting of coal and heavy hydrocarbons or a synthetic gas comprising major amounts of hydrogen, CO, and light hydrocarbons derived from coal or heavy hydrocarbons. We are limited to a liquid having a boiling point of no more than about 350° F because of present day catalysts. However, if another catalyst were discovered, the boiling point could be raised without affecting the operability of my invention.

The catalytic reformer 6 is heated by indirect exchange through a reactor coolant loop 12 connected to the core 4. The coolant, selected from a group consisting of noble gas and carbon dioxide and, preferably, helium, flows through the catalytic reformer 6 and exits from the reformer 6 in a line 14. The coolant flows through line 14 into the steam generator 8 where some of the heat is extracted to make steam. The coolant then passes from the steam generator 8 to a blower 16 where it is compressed before it is recirculated into the core 4. Water is supplied to steam generator 8 through line 13. The steam produced from the steam generator 8, and extracted through a line 9, may be used for generation of electric power or other end uses as desired or necessary.

A reactant selected from the group consisting of $H_2O$, $CO_2$ and mixtures thereof, and preferably $H_2O$, which I prefer to be in the form of steam in a steam-to-carbon ratio of about 1:1 to about 5:1, is supplied to the catalytic reformer 6 through line 18 in an amount sufficient to react with the fluid and, at the same time, substantially inhibit carbon deposition on the catalyst, depending on what pressure is selected to operate the reformer 6.

By proper selection of the steam-to-carbon ratio, carbon deposition on the catalyst is inhibited. The catalyst is preferably a nickel catalyst (not shown) in the reformer 6. For example, at a pressure of 700 psig, a 5:1 $H_2O$-to-carbon ratio is desirable to prevent excessive carbonization of the catalyst which would render it inactive. Conversely, $H_2O$ loads in excess of 5:1 will place an unnecessary thermal burden on the reformer 6. At a reforming pressure of 200 psig, approximately 2:1 $H_2O$-to-carbon ratio is desirable to prevent carbon deposition on the catalyst and $H_2O$-to-carbon loads in excess of this volume will again place an unnecessary thermal burden on the reformer 6.

It will be understood by those skilled in the art that operating pressures between 200 and 700 psig require a different steam-to-carbon ratio; however, it will always fall within the steam-to-carbon limitation of about 1:1 to about 5:1. Due to mechanical design considerations, my preferred operating pressure for the incoming fluid in the catalytic reformer 6 is between about 400 to about 600 psig and is ideally from about 450 to about 500 psig.

A gas product from the reformer 6, at a temperature between about 1000° and about 1800° F, preferably between about 1250° to about 1550° F, and the most preferred temperature between about 1350° to about 1550° F, which can be treated to provide a reducing gas having major amounts of hydrogen and carbon monoxide in an amount between about 50 to about 97 percent and preferably from about 85 to about 97 percent. The gas from the reformer 6 will have from about 5.5 to about 34 percent, and preferably from about 8 to about 20 percent by volume (dry basis) of unreacted hydrocarbons in addition to $CO_2$ and $H_2O$. The gas is collected from line 22 and passed to a gas purification unit, generally designated as 24. The gas purification unit 24 has a gas quenching unit 26, a carbon dioxide removal unit 28 and a cryogenic purifier 20, all of which can be supplied by C. F. Braun and Co. of Alhambra, Calif. Optionally, a further removal of $H_2O$ can be affected by the provision of molecular sieves (not shown) to prolong the period before derimming of the cryogenic purifier 30 exchangers is required due to ice formation. Optionally, a carbon dioxide removal unit 28 is provided to prevent freezeout of a cryogenic purifier 20 due to the removal of carbon dioxide in the cryogenic purifier 30. The provision of the carbon dioxide removal unit 28 should prevent the necessity of providing a dual coil system in the cryogenic purifier 30 that would be required if the carbon dioxide removal unit 28 is not provided. The dual coil would be required so that when one coil freezes out, the second coil could be used to continue to remove the unreacted hydrocarbons remaining in the gas while the first coil is derimmed.

The collected gas first passes through the gas quenching unit 26 from line 22 where it is cooled by indirect contact with water supplied through line 32. The hot gases passing through the quenching unit 26 in indirect contact with the water generates steam which is removed from the quenching unit 26 through a line 34. The steam can be used to supply at least a portion of the $H_2O$ feed stream 10 for the catalytic reformer 6 or for heat requirements in various other points in the process (not shown). A water removal unit (not shown) is an integral part of the quench unit 26 to remove the excess water from the gas. Alternatively, direct water quenching could be used when steam generation is not required.

The cooled gas, at about 150° F or less, leaves the quench unit 26 through line 36 and enters the carbon dioxide removal unit 28 where the carbon dioxide is substantially removed and vented to the atmosphere through line 38. The balance of the gas then leaves the carbon dioxide removal unit 28 through line 40 and enters the cryogenic purifier 30 to remove a sufficient amount of unreacted hydrocarbon to render the gas acceptable for a downstream direct reduction process. Because of the reformer pressure is greater than the pressure required for the shaft reducer 50, the energy for refrigeration can be obtained through a turbo expander, as for example, connected directly to a compressor, utilizing the pressure in the gas so that no external energy is needed in the operation of the cryogenic purifier 30. At the same time, the temperature of the gas undergoing decompression is significantly reduced to aid in the cryogenic purification process. The gas for use in the direct reduction process leaves the cryogenic purifier 30, containing no more than about 5 percent by volume on a dry basis of unreacted hydrocarbon through line 42, and is sent to a reheater 44, which can also be supplied by C. F. Braun and Co. of Alhambra, Calif. The unreacted hydrocarbon is collected and passed from the purifier 30 through line 46 back to the reformer 6. The reheater 44 is equipped with coils in the stack to recover heat from the flue gases before they are discharged to the atmosphere. Boiler feed water is supplied through line 45 to the stack coil to make steam which exits through line 47 for various uses (not shown) throughout the plant.

Alternatively, the catalytic reformer 6 can become an intermediate exchanger between a reformer 20 and the core 4 to provide a barrier between the reformer gas produced in reformer 20 and the core 4. In this case, a secondary coolant, selected from the group consisting of noble gases and carbon dioxide and, preferably, helium, is fed to the exchanger 6 through line 10 where it is heated by indirect exchange with the primary reactor coolant. The heated secondary coolant passes from exchanger 6 through line 22 to reformer 20 where it is used as a source of heat for the reforming reaction. Cooled secondary coolant passes from reformer 20 through line 10, as described above. In the alternate case, line 18 is not used, and $H_2O$ is added to the reformer through line 17 which joins line 11, supplying the reformer fluid to reformer 20. Reducing gas formed in reformer 20 exits through line 21 to the purification section 24 where it proceeds as described previously.

The purified gas is reheated in reheater 44 to a temperature of about 1400° to about 1800° F. The gas is then passed from the reheater 44 through the line 48 into the lower half of a shaft reducer 50. Lump iron ore or iron ore pellets are introduced into the top of the shaft reducer 50 through line 52 and passed down through the shaft reducer 50 countercurrent to the flow of the reducing gas supplied from line 48. The off-gases from the shaft reducer 50 exit near the top through line 54 and are passed to the scrubber 56. The gases are in direct contact with water within the scrubber 56. Water is supplied to the scrubber 56 through line 58 from a supply source (not shown) to provide the necessary cooling in the scrubber. Condensed water from the gases along with the scrubber feed water are removed from the bottom of scrubber 56 through line 60 to a disposal source (not shown). Cooled dehydrated reducer off-gas passes from the top of the scrubber to line 62.

Alternatively, a portion of the heat in the shaft reducer off-gas could be removed by indirect steam generation. Cooled dehydrated reducer off-gas in line 62 is split three ways with from about 40 to about 60 percent passing through line 64 to another carbon dioxide remover unit 66. Carbon dioxide is removed from the carbon dioxide remover unit 66 and vented to the atmosphere through line 68. Purified reducing gas exits the carbon dioxide remover unit 66 through line 70 to a blower 72 where it is compressed and discharged to line 74 and combines with gases in line 42 which are fed to the reheater 44. Preferably, a second portion of the gases, which comprises from about 30 to about 40 percent of the gases in line 62, is directed through line 76 to a blower 78 where it is compressed and fed through a line 80 near the bottom of the shaft reducer 50. This gas serves to cool the reduced pellets before they are discharged from the bottom of the shaft reducer 50 through line 82 for further downstream processing, such as in an electric furnace (not shown).

The third portion of the gas, amounting to from about 2 to about 25 percent of the gases in line 62, is passed through line 84 to reheater 44 where it is used as a source of fuel to fire the reheater 44.

Alternatively, the reheater 44 could be fired from fuel obtained from outside sources or by indirect exchange with the HTGR reactor coolant, in which case, the portion of the gas presently used for fuel would be cycled through the carbon dioxide removal unit 66 and then to the reheater 44.

Figure 3:
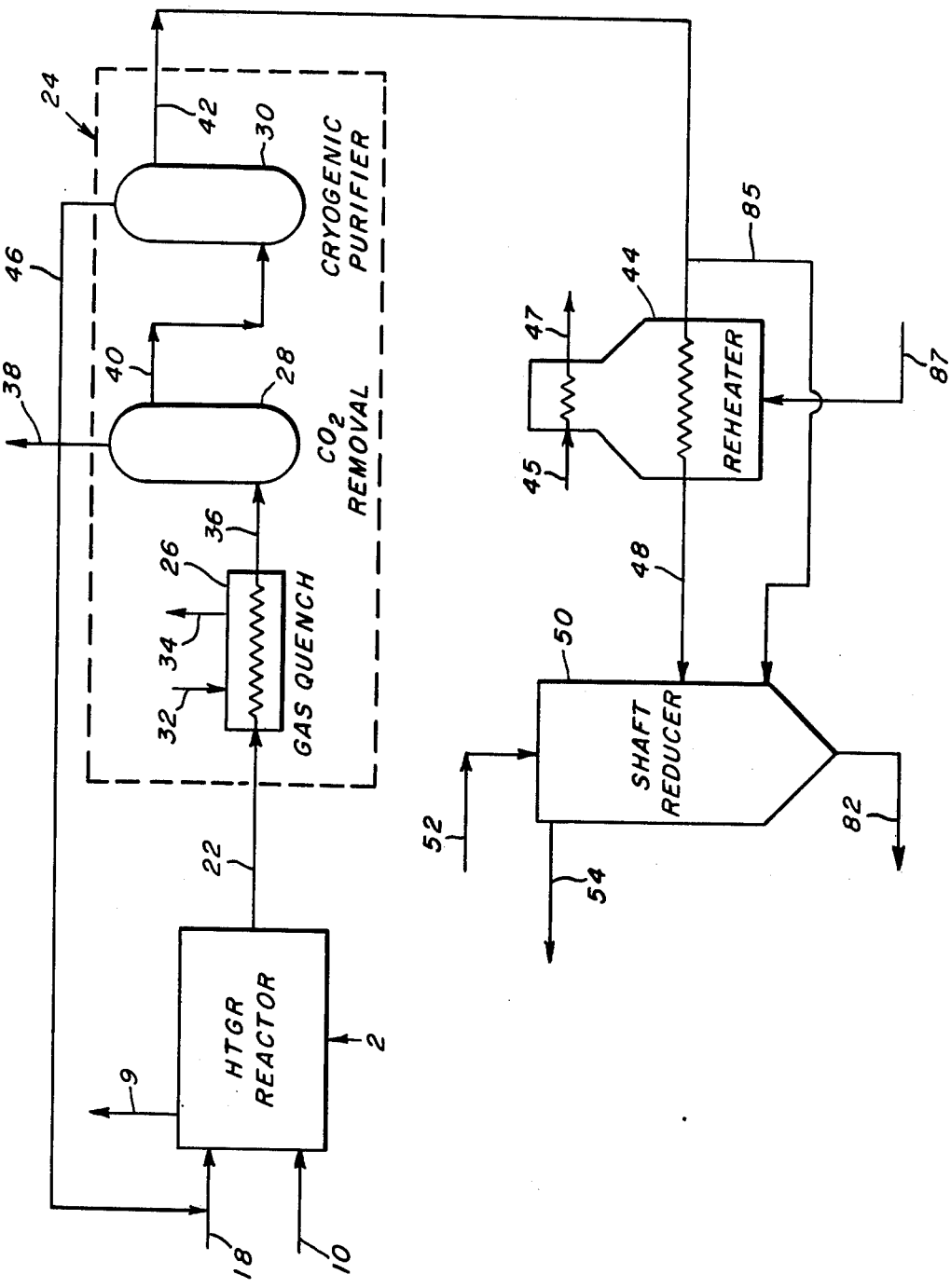
FIG. 3 is a diagrammatic view showing an alternative flowsheet of my invention.

FIG. 3 shows another alternate way of handling the gases used to reduce the iron pellets of lump iron ore in the shaft reduction furnace 50. In this case, the cold gases from line 42 are split with about 45 to about 75 percent being reheated in reheater 44 to supply the hot reducing gas fed through line 48 to the shaft reducer 50. Another portion of about 25 to about 55 percent is supplied through line 85 to the lower portion of the shaft reducer 50 to supply the required cooling of the reduced product before such product is discharged from line 82 at the bottom of the shaft reducer 50. In this case, the off-gases from the top of the shaft reducer 50 are removed through line 54 and can be used in any desired manner. This arrangement requires an external fuel source 87 to fire the reheater 44. I recognize that some end uses will require additional gas treatment. For example, cold fuel gas will require scrubbing in scrubber 56, as described previously.

It can be seen from the above description that I have invented a method of reforming a fluid selected from the group consisting of gaseous and light hydrocarbon liquids to manufacture a reducing gas useful in a direct reduction process, comprising passing the fluid into a catalytic reformer; heating the catalytic reformer by indirect exchange through a reactor coolant loop connected to a high-temperature gas-cooled nuclear reactor; passing a reactant selected from the group consisting of $H_2O$, $CO_2$ and mixtures thereof into the reformer in an amount sufficient to react with the fluid while substantially inhibiting carbon deposition on the catalyst; collecting a gas product from the reformer, the gas product having major amounts of hydrogen and carbon monoxide and from about 5.5 to about 34 percent by volume (dry basis) of unreacted hydrocarbon; removing a sufficient amount of unreacted hydrocarbons, carbon dioxide, and $H_2O$ to render the gas unacceptable for the downstream direct reduction process; and collecting the unreacted hydrocarbon.

While in accordance with the patent statutes, a preferred and alternative embodiments of the invention have been illustrated and described in detail, it is to be particularly understood that the invention is not limited thereto or thereby, but we intend to be limited only by the scope of the appended claims.

I claim:

1. A process for the direct-reduction of iron ore, said process comprising:
    a. passing iron-ore pellets or lump iron ore into the top of the shaft reducer;
    b. producing a reducing gas for introduction into the lower half of said shaft reducer in counter current flow to the pellets, said reducing gas being produced from a fluid, selected from the group consisting of gaseous and light hydrocarbon liquids, which is passed to a catalytic reformer operated at a pressure of from about 200 to about 700 psig, said catalytic reformer being heated by indirect exchange through a reactant coolant loop connected to a high-temperature gas-cooled nuclear reactor operated at a pressure of about 200 to 700 psig and a corecoolant temperature of less than about 1650° F and having a reactant selected from the group consisting of $H_2O$, $CO_2$, and mixtures thereof, passed into said reformer in an amount sufficient to (i) react with the fluid to produce a product gas containing hydrogen and carbon monoxide in a sum of from about 50 to about 97 percent, and from about 5.5 to about 34 percent by volume (dry basis) of unreacted hydrocarbon and (ii) inhibit carbon deposition on the catalyst, collecting said gas produced from said reformer, removing a sufficient amount of unreacted hydrocarbon, carbon dioxide and $H_2O$ to render the gas acceptable for direct-reduction, said unreacted hydrocarbon being removed to a level of less than about 5 percent by volume (dry basis), said removal resulting in cooling said gas;
    c. then passing at least a portion of said gas through a reheated to heat said gas to a temperature between about 1400° to about 1800° F;
    d. passing said reheated gas into the lower portion of said shaft reducer to reduce the oxygen content of said iron-ore pellets or said lump iron ore to produce iron pellets or sponge iron;
    e. passing a cooling gas into said shaft near the bottom thereof to cool said reduced iron pellets or sponge iron prior to discharge from said shaft reducer; and
    f. discharging said iron pellets or sponge iron from said shaft reducer.

2. A process according to claim 1 wherein said collected hydrocarbon is removed cryogenically.

3. A process according to claim 1 including the additional step of collecting the off-gas from said shaft reducer and recirculating a portion of said off-gas to the lower portion of said shaft reducer to cool said reduced pellets or lump ore prior to discharge from said shaft reducer.

4. A process according to claim 1 wherein the off-gases are collected from said shaft reducer and a portion of said off-gases is fed to a carbon dioxide removal station where said carbon dioxide is removed from said off-gases producing a purified reducing gas which is fed to said reheater for recirculation back through said shaft reducer.

5. A process according to claim 1 wherein the off-gases from said shaft reducer are collected and from about 2 to about 25 percent of said collected off-gases are recycled to said reheater for use as a fuel to fire said reheater.

6. A process according to claim 1 wherein said reformer is operated at a pressure greater than the pressure required for said shaft reducer and at least some of the energy for refrigeration is obtained through a turbo expander, utilizing the pressure in the gas.

7. A process according to claim 1 wherein said reactant is $H_2O$ and is passed to said reformer in an amount sufficient to provide a steam-to-carbon ratio that will substantially inhibit carbon deposition on the catalyst.

8. A process according to claim 1 wherein the unreacted hydrocarbon removed in step (b) is recirculated to said catalytic reformer.

9. A process according to claim 1 wherein said unreacted hydrocarbon is present in said gas product collected from said reformer in an amount of from about 8 to about 20 percent (dry basis).

10. A process according to claim 1 wherein said core coolant temperature is greater than about 1430° F.

11. A process according to claim 1 wherein said pressure is from about 400 to about 600 psig.

12. A process according to claim 1 including the additional step of providing an intermediate loop in the necessary coolant associated therewith interposed between the catalytic reformer and the nuclear reactor to provide a barrier between said nuclear reactor and said reformer gas.

13. A process according to claim 1 wherein said hydrogen and said carbon monoxide comprise from about 85 to about 97 percent of said gaseous product in step (d).

14. A process according to claim 7 wherein said steam-to-carbon ratio in said gas is between from about 1:1 to about 5:1.

* * * * *

UNITED STATES PATENT OFFICE
CERTIFICATE OF CORRECTION

Patent No. 4,047,935　　　　　Dated September 13, 1977

Inventor(s) Thomas F. Barnhart

It is certified that error appears in the above-identified patent and that said Letters Patent are hereby corrected as shown below:

In the title, change "POWDERED" to -- POWERED --.

Column 2, line 16, change "the" to -- these --;

line 48, before "gas" insert -- reducing --.

Column 4, line 54, change "20" to -- 30 --;

line 61, change "20" to -- 30 --.

Column 7, line 58, claim 1, change "reheated" to
　　　　　　　　　　　　　　　　　　　　-- reheater --.

Signed and Sealed this

Twenty-eighth Day of February 1978

[SEAL]

Attest:

RUTH C. MASON　　　　　LUTRELLE F. PARKER
Attesting Officer　　　Acting Commissioner of Patents and Trademarks